April 17, 1962 H. L. DUNLAP 3,029,746
CROSS MEMBER
Filed Aug. 5, 1958 2 Sheets-Sheet 2
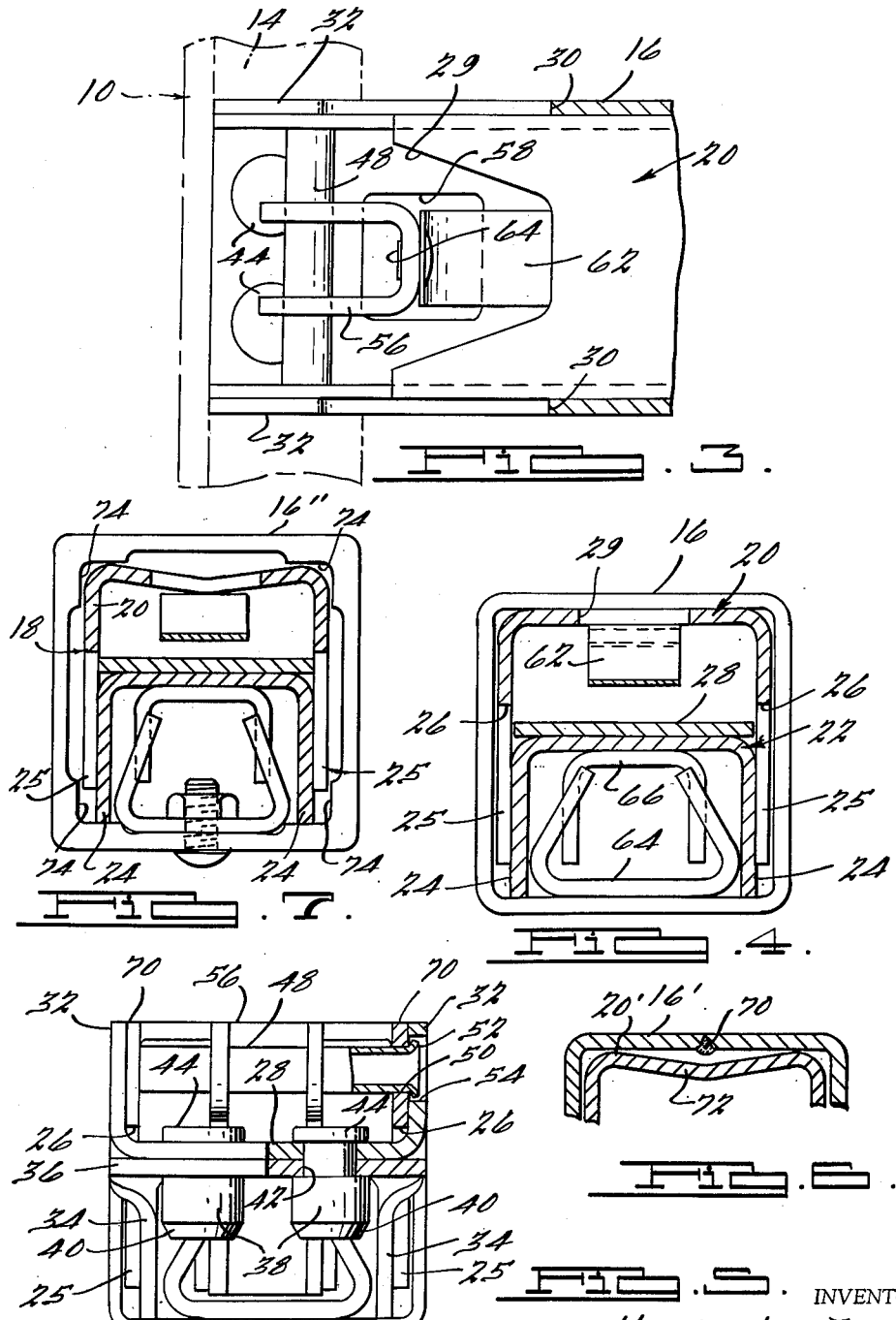
INVENTOR.
Henry Lee Dunlap
BY
Harness, Dickey & Pierce
ATTORNEYS.

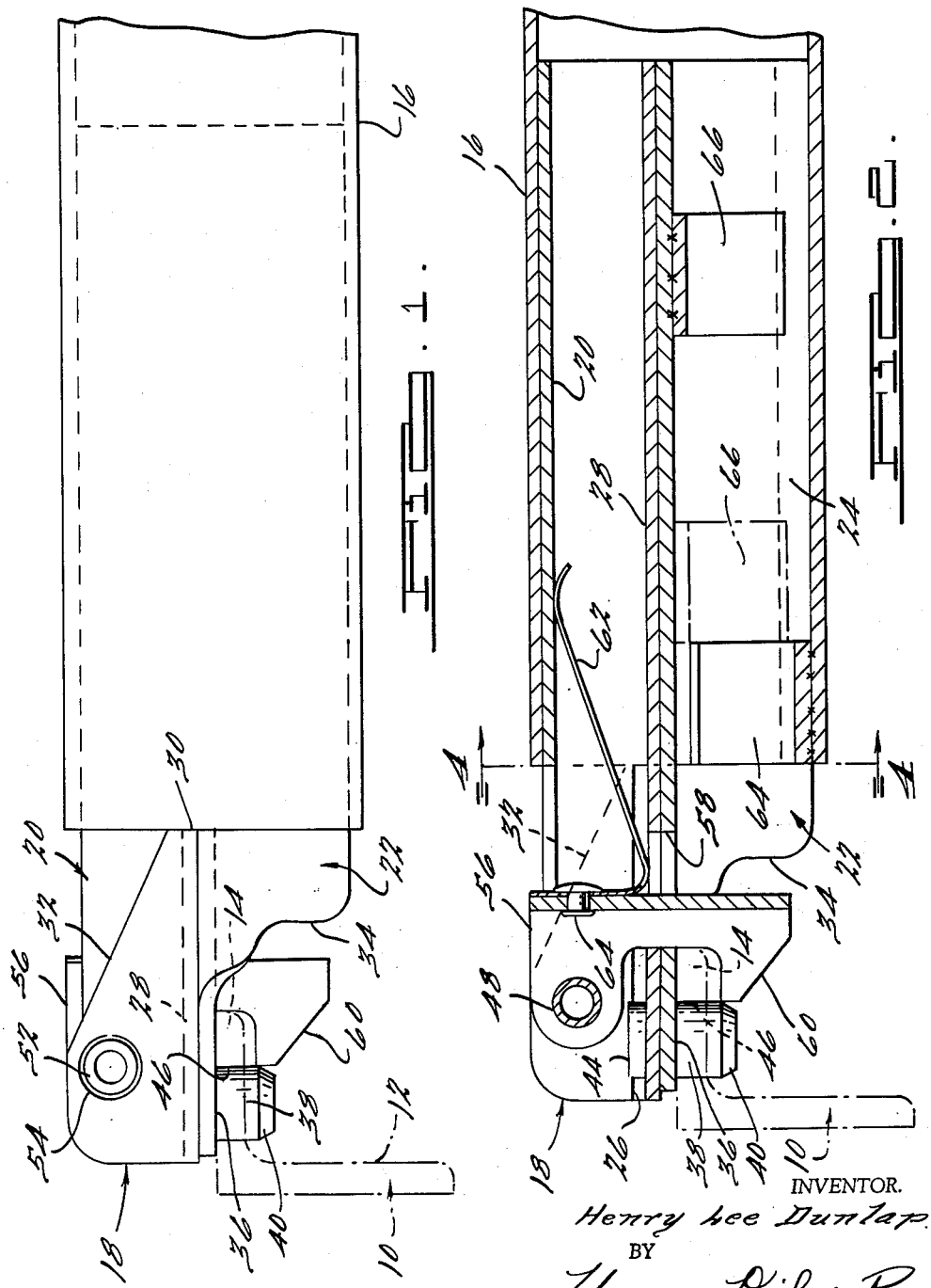

United States Patent Office 3,029,746
Patented Apr. 17, 1962

3,029,746
CROSS MEMBER
Henry L. Dunlap, Dearborn, Mich., assignor to Evans Products Company, Plymouth, Mich., a corporation of Delaware
Filed Aug. 5, 1958, Ser. No. 753,380
9 Claims. (Cl. 105—369)

This invention relates to cargo bracing equipment such as commonly used in trucks, railroad freight cars, ships and storage compartments in general where it is desired to hold articles of freight in a proper position so as to prevent damage to them. In particular, the invention refers to an improved cargo or freight bracing bar. It is related to that which is disclosed and claimed in a copending application, Serial No. 545,195 filed November 7, 1955, now Patent No. 2,879,721 dated March 31, 1959, and assigned to the assignee hereof and reference to that application, as well as its parent cases, now Patents Nos. 2,497,683 and 2,725,826, will show in much greater detail the nature of the freight bracing equipment and systems in which the present invention may be employed.

The freight or cargo bracing bars used in freight bracing systems are provided with attaching means at opposite ends to enable them to be quickly attached to and removed from suitable support elements in the freight storage compartment. In the case of moving vehicles the attaching means must be designed to positively hold the bar in place in spite of rather severe and sudden forces that may be applied to the bar in many different directions. It is also imperative that the attaching means be designed so that it can be readily connected to and disconnected from the support elements by workers with absolutely no training or mechanical skill. Further, it must be rugged enough to withstand rough usage and abuse and yet be light enough in weight to make its use practical.

With the foregoing requirements in mind, it is an object of the invention to provide a strong, rugged, easily handled attaching means for the ends of a freight bracing bar which will automatically position itself in an operative or latching position but which automatically retracts while the bar is being connected to a support element.

It is a further object of the invention to provide a positive latch for a cargo bar designed so that loads on it tend to drive it more firmly into latching position.

Another object of the invention is to provide an attachment means embodying structure which accomplishes the above objects and the major components of which may be economically fabricated from sheet metal or channel-shaped members to make the attachment means more practical.

Another object of the invention is to provide a tubular cargo bar having an attachment means fabricated from channel-shaped structural members disposed in both ends thereof and adapted to releasably engage supporting members mounted on opposite sides of the body, one of the attachment means being fixed and the other being telescopically mounted on the end of the cargo bar.

It is also an object of the present invention to provide an improved lightweight, rugged end fitting which is readily mountable in a cross bar body of steel or aluminum tubing.

It is a further object of the present invention to provide a lightweight, rugged end fitting which may be readily used as either a fixed or telescopic end fitting.

Other objects and features of the invention will become apparent upon consideration of the accompanying drawings wherein:

FIGURE 1 is a broken side elevational view of one form of the invention;

FIGURE 2 is a longitudinal sectional view of the structure illustrated in FIGURE 1;

FIGURE 3 is a plan view, broken away, of the structure illustrated in FIGURE 1;

FIGURE 4 is a sectional view of the structure illustrated in FIGURE 2, taken along the line 4—4 thereof;

FIGURE 5 is an end view, partially broken away, of the structure illustrated in FIGURE 1;

FIGURE 6 is a fragmentary sectional view showing a modified construction using a welded steel tubing body; and, FIGURE 7 is a sectional view similar to FIGURE 4 of a further modification using an extruded aluminum body.

As described in more detail in the patents and application referred to above, the freight cargo bracing bar of this invention (sometimes also referred to as a "cross" bar) is used in connection with a support member 10 having a vertical flange 12 and a horizontal flange 14. In the case of a freight car, truck or trailer, the support members 10 are located in pairs on opposite sides of the body of the truck or trailer and extend longitudinally fore and aft of the body being ordinarily parallel to the floor and secured in a fixed manner as by welding to the side wall structure of the body.

Each pair of support members 10 are commonly referred to as a "belt line" and are nearly always on the same level, that is, located the same distance above the floor of the body. The elongated body or beam portion 16 of the cross bar may be of any desired shape and in the preferred embodiment illustrated is tubular and square in cross section. The bar body 16 illustrated is formed of steel tubing and carries at each end fitting 18 at each end which is adapted to be connected to the support members 10 so that the cross bar can extend transversely across the body of the truck or trailer.

While the structure just described represents a very common arrangement and application of cross bars of the present invention, it will be understood that the invention can be used in various other ways. It will also be recognized that though only one end of a cross bar is shown in the drawings, the other end may be similar in construction and hence need not be illustrated herein.

The end fitting 18 is comprised of a channel-shaped member 20 and a second channel-shaped member 22 having the legs thereof secured between the downwardly extending legs of the member 20, as by spot welding along their contacting surfaces or by other suitable means. The members 20 and 22 may be formed of sheet metal, structural steel, or the like. It will be observed that legs 24 of the member 22 project downwardly further than the legs 25 of the member 20 so that they slide on the inside bottom surface of the cross bar 16 to position the end fitting 18 vertically within the cross bar while the outer surfaces of the legs 25 of the member 20 position the end fitting laterally within the cross bar. This construction provides a very beneficial adjustment feature in that the distance which the legs 24 project beyond the legs 25 can be correlated with the vertical inside dimension of the cross bar 16 to insure a proper fit.

The ends of the legs 25 of the member 20 are cut away as at 26, as most clearly illustrated in FIGURE 4, and the web thereof has a notch 29 formed therein as most clearly illustrated in FIGURE 3 for a purpose which will be described in greater detail hereinafter. A reinforcing plate 28 is spot welded or otherwise secured to the web of the member 22 and is notched or shouldered as at 30 to permit upwardly extending wings 32 thereof to pass on the outside of the legs 25 of the member 20 and to be spot welded or otherwise secured thereto.

As most clearly illustrated in FIGURES 1 and 5, the legs 24 of the member 22 are cut away as at 34 and bent outwardly to provide a flat portion 36 for engaging the horizontal flange 14 of the supporting member 10. Two pins 38 having truncated conical end portions 40 are mounted on the end fitting 18 by inserting the shanks thereof upwardly through apertures 42 in the web of the member 22 and the plate 28 as most clearly illustrated in FIGURE 5, and heading over the ends of the shanks as at 44 to secure them in position.

It will be observed that the pins 38 are spaced to fit simultaneously in two of a plurality of holes 46 in the flange 14 of the support member 10. The pins in the preferred embodiment illustrated are spaced apart by a distance equal to the spacing of the holes 46 and the midpoint between the pins may be offset from the longitudinal axis of the cross bar 16 in a transverse direction, if desired, so that pitch splitting may be obtained by reversing the bar end for end as more clearly pointed out in the aforesaid copending application.

A tubular pin 48 is supported within aperture 50 in the legs 25 of the member 20 and the ends thereof peened over as at 52 to secure the pin in position. Enlarged apertures 54 are provided in the wings 32 to permit the end of the pin to be peened over in this manner as most clearly illustrated in FIGURE 5. It will be observed that the apertures 54 are sufficiently large to compensate for any slight misalignment between the apertures 50 and 54 which may occur during assembly. Further, by supporting the pin 48 within the apertures 54, the outer surface of the wings 32 are flush and free from any projections.

A latch 56 extends through an aperture 58 in the plate 28 and the web of the member 22 and has the upper end thereof pivotally mounted on the pin 48. The latch is channel shaped and preferably made from sheet metal with a hook portion 60 formed on the lower end thereof which is adapted to engage the underside of the flange 14 to prevent disengagement of the pins 38 after they have been positioned within the holes 46 in the flange 14 of the supporting member 10. The latch 56 is prevented from sliding along the axis of the pin 48 by the sides of the aperture 58. A suitable flat spring 62 is fastened to the web of the latch 56 by a rivet 64 or other suitable means, and bent so that the other end thereof resiliently engages the inner surface of the web of the member 20. In this manner the latch 56 is normally urged against the edge of the aperture 58 as illustrated in FIGURES 1 and 2 and can be pivoted in a counterclockwise direction against the action of the spring to permit the pins 38 to be disengaged from or engaged with the holes 46 in the support member 10. Of course, when the pins 38 are moved into engagement with the holes 46, the spring 62 will automatically urge the latch into latching position as illustrated in FIGURE 1 as soon as the hook 60 is free to pivot beneath the flange 14.

It will be observed that the point of contact between the hook portion 60 of the latch and the flange 14 is to the right of the center of the pin 48, and therefore, any uploads on the cross bar 16 will tend to pivot the latch in a clockwise direction as viewed in FIGURE 1, which tends to drive the latch into locking position. The notch 29 of the web of the member 20, as illustrated in FIGURE 3, permits the latch 56 with the spring 62 attached thereto to be passed downwardly into position prior to the insertion of the pin 48 without over-distorting the spring. The contour of the notch 29 further serves to prevent an abrupt change in cross section in the member 20 which would result in stress concentration.

The angled lower left corner of the hook 60, as viewed in FIGURES 1 and 2, serves as a cam surface for pivoting the latch out of the path of the flange 14 during movement of the cross member into the attached position illustrated in FIGURES 1 and 2. Since the pins 40 are inserted in the apertures 46 in the flange 14 and the flange 14 is out of the path of movement of the hook portion 60 of the latch 56, the latch is returned to the latched position illustrated both by the force of gravity and by the action of the spring 62.

Referring the FIGURES 2 and 4, a relatively wide U-shaped stop member 64 is spot welded or otherwise secured to the lower surface of the cross bar 16 at the end thereof, and a second U-shaped stop member 66 is spot welded or otherwise secured to the web of the member 22, the legs of the stop member 64 being more widely spaced than the legs of the member 66. In this manner the end fitting 18 may be inserted within the end of the cross bar 16 so that the stop member 66 passes through the wider legs of the channel stop 64 to the position illustrated in FIGURE 2. The legs of the channel stop 64 may then be bent inwardly to the position illustrated in FIGURE 4 so that they will limit the outward movement of the end fitting 18, the inward movement of the end fitting being limited by the notch portion 30 of the plate 28 as illustrated in FIGURE 3, as well as the vertical edges of the wings 32. If desired, the channel stop 66 may be positioned to provide no telescopic movement or any desired amount of it. In the preferred embodiment, telescopic movement is provided for by securing the stop 66 in the position illustrated in full lines. The outward limit is reached when stop 66 reaches the dotted line position in FIGURE 2 and engages the stop 64.

FIGURE 6 illustrates a modified construction in which the bar body 16' is formed of welded steel tubing, the weld 70 being disposed at the center of the top of the body 16' which overlies the web 72 of the channel-shaped member 20'. As is clearly illustrated in FIGURE 6, the central portion of this web 72 is offset inwardly avoiding interference with the weld 70.

FIGURE 7 illustrates that the end fitting 18 of the present invention may also be readily mounted in the end of a cross member body 16" formed of an extruded lightweight metal such as aluminum. In the construction illustrated, the body 16" has raised bearing pads 74 formed at each corner. During assembly of the end fitting 18 with the cross member body 16", and during telescopic movement of the end fitting 18 relative to the body 16", the corners of the channel member 20 are guided on the upper bearing pads illustrated in FIGURE 7, and the legs 24 and 25 of the members 20 and 22 are guided on the lower bearing pads 74.

While it will be apparent that the embodiments of the invention herein disclosed are well calculated to fulfill the objects of the invention, it will be appreciated that the invention is susceptible to modification, variation and change without departing from the proper scope or fair meaning of the subjoined claims.

What is claimed is:

1. A cargo bracing bar for attachment to a supporting surface extending substantially parallel to the bar, said bar including an elongated bar body having a recess in one end thereof, an end fitting comprising first and second channel-shaped members, said second member being disposed within said first member with the legs thereof affixed to the legs of said first member and the web thereof parallel to the web of the first member, the legs of both of said members extending in the same direction with the legs of the second member projecting beyond the legs of the first member, means on one end of said fitting for releasably engaging said supporting surface, the other end of said fitting being mounted within said recess of said bar, the legs of said first member positioning the channel-shaped members laterally within said recess in said bar body and the projecting portions of the legs of the second member co-operating with said web of said first member for positioning said members vertically within said recess in said bar body.

2. The subject matter as claimed in claim 1 including stop means for limiting the telescoping action of the channels relative to the end of said bar body.

3. The subject matter as claimed in claim 2 wherein said stop means includes a first stop element affixed to the inner surface of said recess and extending between the legs of said second member, and a second stop element affixed to the web of said second member and disposed in interfering relation with said first stop element to limit the outward telescoping movement of the end fitting relative to the end of said bar.

4. An end fitting for a cargo bracing bar for attachment to a supporting surface extending substantially parallel to the bar and which bar includes an elongated bar body having a recess in one end thereof, said end fitting comprising first and second channel-shaped members, said second member being disposed within said first member with the legs thereof affixed to and extending in the same direction as the legs of said first member, the legs of said first member being partially cut away at one end of said fitting so that they do not overlap said second member, the legs of said second member at said one end being bent outwardly into the plane of the web thereof to provide a flat portion for engaging said supporting surface, and means on said one end of the fitting for releasably engaging the supporting surface, said first and second channel-shaped members at the other end of the fitting extending into said recess to mount said end fitting on said bar body.

5. An end fitting for a cargo bracing bar for attachment to a supporting flange extending substantially parallel to the bar and which bar includes an elongated bar body having a recess in one end thereof, said end fitting comprising first and second channel-shaped members, said second member being disposed within and affixed to said first member with the web thereof parallel to the web of the first member and the legs of both of said members extending in the same direction, the legs of said first member being partially cut away at one end of said fitting so that they do not overlap said second member, a reinforcing plate affixed to the outer surface of the web of said second member and having wing portions extending upwardly over the outside of the cutaway legs of the first member, the legs of the second member at said one end being bent outwardly into the plane of the web thereof to provide a flat portion for engaging said supporting surface, and means on said one end of the fitting for releasably engaging the supporting surface, said first and second channel-shaped members at the other end of the fitting extending into said recess to mount said end fitting on said bar body.

6. The subject matter as claimed in claim 5 wherein said means comprises pin means projecting from said flat portion for engaging holes in said supporting surface, and latch means mounted on said one end of the fitting for engaging the underside of the supporting flange to releasably retain said pin means in said holes.

7. A cargo bracing bar for attachment to a supporting flange extending substantially parallel to the bar and having a plurality of apertures spaced therealong, an elongated bar body having a recess in one end, an end fitting comprising first and second channel-shaped members, said second member being disposed within said first member with the web thereof parallel to the web of said first member and the legs of both of said members extending in the same direction, means affixing the legs of said first member to the legs of said second member with the legs of the second member extending beyond the legs of the first member to co-operate with the web of said first member to provide a desired size of said end fitting measured at right angles to said webs, the legs of said first members being partially cut away at one end of said fitting so that they do not overlap said second member, a reinforcing plate affixed to the web of said second member and having wing portions extending upwardly adjacent the outer surfaces of the cutaway legs of the first channel, the legs of said second member being bent outwardly at said one end of said fitting into the plane of the web thereof to provide a flat portion for engaging said supporting flange, pin means projecting downwardly from said flat portion for reception in said apertures in said supporting flange, and latch means for engaging the underside of said supporting flange to releasably retain said pin means received in said apertures, said first and second channel-shaped members at the other end of said fitting being telescopically received within said recess to mount said end fitting on said bar body, and co-operating stop means on said fitting and said bar body for limiting the telescoping action of the end fitting outwardly of the bar body, said wing portions extending laterally outwardly a sufficient distance to limit the telescoping action of said end fitting in the inward direction by the engagement of said wing portions with the end of the bar body.

8. The subject matter as claimed in claim 7 wherein said stop means includes a U-shaped member affixed to said bar body with the legs thereof extending between the legs of said second member, and a second U-shaped member affixed to the web of said second member with the legs thereof extending in the opposite direction as the legs of said first U-shaped member and in interfering relation therewith whereby the legs of the first U-shaped member are engageable with the legs of the second U-shaped member to limit telescopic movement of said end fitting outwardly of said bar body.

9. In a cargo bracing bar for attachment to a supporting flange extending substantially parallel to the bar and having a plurality of apertures spaced therealong, an elongated bar body having a recess in one end, an end fitting comprising first and second channel-shaped members, said second member being disposed within said first member with the web thereof parallel to the web of said first member and the legs of both of said members extending downwardly, means affixing the legs of said first member to the legs of said second member with the legs of said second member extending beyond the legs of said first member to co-operate with the web of said first member to provide a desired size of said end fitting measured at right angles to said webs, the legs of said first member being partially cut away at one end of said fitting so as to extend downwardly to a point above the web of said second member, a reinforcing plate affixed to the upper surface of the web of said second member and having wing portions extending upwardly adjacent the outer surface of the cutaway legs of the first member, the legs of the second member being bent outwardly at said one end into the plane of the web so as to provide a flat portion for engaging said supporting flange, pin means on said flat portion for releasably engaging said apertures in said supporting flange, and a latch extending through said reinforcing plate and the web of said second channel and having an upper end thereof pivotally supported between the legs of said first channel and said wings adjacent thereto and a hook portion on the lower end thereof for releasably engaging said supporting flange to retain said pin means in engagement therewith, said first and second channel-shaped members at the other end of the fitting being received within said recess to telescopically mount said end fitting on said bar body.

References Cited in the file of this patent

UNITED STATES PATENTS

| 1,064,130 | Conlin | June 10, 1913 |
| 1,781,318 | Byington | Nov. 11, 1930 |
| 2,056,704 | Anderson | Oct. 6, 1936 |
| 2,425,875 | Hermann | Aug. 19, 1947 |
| 2,476,362 | Fahland | July 19, 1949 |
| 2,769,404 | Dietrichson | Nov. 6, 1956 |
| 2,806,436 | Johnston | Sept. 17, 1957 |
| 2,817,549 | Fahland | Dec. 24, 1957 |
| 2,836,131 | Nampa et al. | May 27, 1958 |
| 2,837,039 | Schueder | June 3, 1958 |
| 2,879,722 | Dunlap | Mar. 31, 1959 |
| 2,887,963 | Dunlap | May 26, 1959 |